US008818837B2

(12) United States Patent
McCalmont et al.

(10) Patent No.: US 8,818,837 B2
(45) Date of Patent: Aug. 26, 2014

(54) MONITORING AND MANAGING REGULATORY COMPLIANCE AMONG ORGANIZATIONS

(75) Inventors: Stephen A McCalmont, Hollis, NH (US); Michael B Courtemanche, Hollis, NH (US)

(73) Assignee: Avior Computing Corporation, Nashua, NH (US)

( * ) Notice: Subject to any disclaimer, the term of this patent is extended or adjusted under 35 U.S.C. 154(b) by 1120 days.

(21) Appl. No.: 12/263,609

(22) Filed: Nov. 3, 2008

(65) Prior Publication Data

US 2009/0119141 A1 May 7, 2009

Related U.S. Application Data

(60) Provisional application No. 60/985,340, filed on Nov. 5, 2007.

(51) Int. Cl.
*G06Q 10/00* (2012.01)
*G06Q 10/06* (2012.01)

(52) U.S. Cl.
CPC ........ *G06Q 10/0635* (2013.01); *G06Q 10/0639* (2013.01); *Y10S 707/99943* (2013.01); *Y10S 707/99948* (2013.01)
USPC . 705/7.28; 705/7.32; 705/7.38; 707/999.102; 707/999.107

(58) Field of Classification Search
CPC ....................... G06Q 10/0635; G06Q 10/0639
USPC ................ 705/7.28, 7.32, 7.38; 707/999.102, 707/999.107
See application file for complete search history.

(56) References Cited

U.S. PATENT DOCUMENTS

| | | | | |
|---|---|---|---|---|
| 2003/0229525 | A1 | 12/2003 | Callahan et al. | |
| 2004/0193907 | A1 * | 9/2004 | Patanella | 713/200 |
| 2005/0065865 | A1 * | 3/2005 | Salomon et al. | 705/35 |
| 2005/0288994 | A1 * | 12/2005 | Haunschild | 705/11 |
| 2006/0241991 | A1 * | 10/2006 | Pudhukottai et al. | 705/8 |
| 2006/0277083 | A1 | 12/2006 | Spielmann et al. | |
| 2007/0130191 | A1 * | 6/2007 | Dawson | 707/102 |
| 2007/0226721 | A1 | 9/2007 | Laight et al. | |

OTHER PUBLICATIONS

Cybertrust Announces Availability of Risk Commander 2.4, PR Newswire. New York: Oct. 12, 2005. p. 1.*
Cybertrust Announces Availability of Risk Commander 2.4. PR Newswire. New York: Oct. 12, 2005. p. 1.*
ControlPath 3.5's Graphical Modeler Saves Time and Money When Deploying Compliance Management Software. Business Wire. New York: Nov. 14, 2006.*
Modulo Security Launches Assessment Automation Tool at Wall Street Technology Association Event; The event will bring together major Wall Street and technology companies operating in New York. PR Newswire [New York] Apr. 4, 2006: n/a.*
PCT Search Report dated Jan. 6, 2009 of Patent Application No. PCT/US08/82196 filed Nov. 3, 2008.

* cited by examiner

*Primary Examiner* — Timothy Padot
(74) *Attorney, Agent, or Firm* — Maine Cernota & Rardin

(57) ABSTRACT

A dynamic system and method for efficiently measuring organizational compliance with multiple, overlapping, selected sources of compliance requirements by making associations of individual source controls and survey questions with a limited set of discrete compliance objectives, and by enabling creation of compliance surveys and analysis of survey answer sets based on user-selected criteria that may include selection of a specific source or sources; one or more discrete compliance objectives, and/or a choice of questions from a master question pool. Custom surveys with weighted questions and dynamic reporting enables responses to compliance audits to be analyzed against a predetermined benchmark result, against responder's own prior results, or against other responders.

27 Claims, 7 Drawing Sheets

AVIOR

DCO Scoring Trend By Quarter

Allomorph Atlantic

| Risk Category | Q1 Score | Q1 Qtr Trend | Q2 Score | Q2 Qtr. Trend | Q3 Score | Q3 Qtr. Trend | Q4 Score | Q4 1 Year Trend |
|---|---|---|---|---|---|---|---|---|
| Risk Management | 1.00 | | 3.00 | | 3.00 | | 5.00 | |
| Access Control | 2.63 | | 3.18 | | 3.54 | | 4.09 | |
| Asset Management | 3.00 | | 3.00 | | 3.00 | | 3.88 | |
| Business Continuity Management | 5.00 | | 1.00 | | 3.00 | | 3.00 | |
| Communication and Operational Management | 3.13 | | 2.79 | | 3.75 | | 4.24 | |
| Compliance | 2.20 | | 2.60 | | 3.80 | | 4.20 | |
| Human Resource Security | 2.83 | | 2.50 | | 2.66 | | 4.00 | |
| Information Security Incident Management | 3.40 | | 3.40 | | 3.00 | | 3.80 | |
| Information Systems Acquisition Developmen | 2.80 | | 2.60 | | 3.60 | | 4.00 | |
| Organizational Security | 3.28 | | 3.00 | | 3.57 | | 3.57 | |
| Physical and Environmental Security | 3.23 | | 3.29 | | 3.11 | | 3.82 | |
| Security Policy | 3.00 | | 1.00 | | 5.00 | | 3.00 | |

This dashboard was generated by the Avior ClearView analytical report engine.

It shows the scores by quarter, the scoring trend by quarter and the yearly scoring trend.

- Page - 1 of 1 - report generated on: May 5, 2008 09:10:58

FIG. 5

MONITORING AND MANAGING REGULATORY COMPLIANCE AMONG ORGANIZATIONS

This application relates to and claims the benefit of, for all purposes, pending U.S. application Ser. No. 60/985,340 filed Nov. 5, 2007.

FIELD OF INVENTION

The invention relates to methods and systems for measuring compliance of organizations with operational rules and requirements set out by selected authoritative sources; and in particular to means for reducing the complexity of measuring compliance with overlapping rules and requirements of multiple authoritative sources.

BACKGROUND OF THE INVENTION

Over thirty U.S. states have adopted individual consumer privacy legislation with varying requirements. Regulatory mandates such as the Health Insurance Portability and Accountability Act of 1996 (HIPAA) on healthcare information privacy, the Gramm-Leach-Bliley Act of 1999 (GLBA), and Sarbanes Oxley Act of 2002 (SOX) affecting financial services, and many other existing or anticipated regulations are of concern to companies trafficing in such information, and to the regulators charged with their oversight. Industry guidelines and standards such as the Payment Card Industry (PCI) Data Security Standard require specific security controls be put in place to provide protection for consumer credit card data or otherwise meet partner and/or industry approval. Determining where and how an organization is storing private financial data or other personally identifiable private information and ensuring that adequate controls are in place to protect this information are significant challenges for organizations of all sizes, in all industries.

In addition to their own compliance, companies are also grappling with assessing and managing risk from third-party service providers and vendors. This problem is particularly acute in the financial industry, where outsourcing and other forms of exposure to liability through information sharing with third parties are prevalent, and regulators are aggressively requiring financial institutions to manage the added risk of poor or non-compliance by their service providers. To help ease the pain of third-party risk assessments for financial institutions and service providers, BITS, a financial industry organization has developed third-party assessment standards as part of its Shared Assessments program.

The BITS Shared Assessment Program, propagated by a financial industry forum, is a relatively new process for financial institutions to evaluate the security controls of their IT service providers. The BITS program is directed to providing efficiencies and cost savings to financial institutions and service providers and helping financial institutions align service provider testing with industry regulations. It depends on agreed upon procedures and a standardized information gathering questionnaire. There are reported to be more than 50 member companies, including 15 major financial institutions, which confirms the need for greater efficiencies in this area. A BITS Product Certification Program tests technology products including software used to deliver financial services, against minimum-security criteria established by the financial services industry.

The recent international "meltdown" of Wall Street and the mortgage and credit markets, blamed at least in part on lax regulatory requirements and oversight, will inevitably result in further national and international regulatory changes and evolving industry standards applicable to a wider range of organizations. Compliance requirements and assessments of international treaties, individual governments and agencies, industries, and market leaders will become an even greater burden, risk, and cost concern for ever more organizations in the years ahead.

The complexity of an individual assessment project increases due to a number of factors: the number of people—"touchpoints"; the diversity in responsibilities of the people; the geographic dispersion of the people; the breath of the assessment questionnaire; and the time period to respond and compile the results. Reductions in the complexity of assessment project directly correlate to the workflow and productivity improvements that an enterprise assessment management solution can provide.

Various schemes have been developed to bring some degree of efficiency to the compliance monitoring and management process. Tables and mapping schemes have been developed to cross reference lists of regulations to a set of questions, so that the answer to one question may be informative with respect to compliance with multiple regulations. However, it should be readily apparent that processes having a many-to-many relationship between questions and regulations exposes a complicated set of relationships that are brittle, and difficult from both use and maintenance perspectives. This approach is of limited utility with respect to an industry-wide solution, due to the widely varying regulations, operations, and questions that would have to be associated to satisfy the needs of all users.

SUMMARY OF THE INVENTION

There is provided in accordance with the invention a host-managed, expert enterprise system and methodology by which entities can efficiently monitor and manage their own and their business partners' compliance with local, national, industry, and international regulations, rules, standards and guidelines for business practices relating to privacy and security of business operations and sensitive data such as personally identifiable health or financial information. In one aspect, an industry or domain wide range of regulatory and industry compliance standards, controls and rules are rationalized to a limited set of discreet compliance objectives (DCOs) or subject areas. These DCOs are further associated by appropriate direct or indirect mappings to a common question pool, whereby standard, blended, or customized compliance assessment surveys for individual industry participants can be efficiently created, conducted, evaluated and updated. The results are easily interpreted to measure the relevant parameters with appropriate scope and depth, in order to characterize compliance to the applicable source requirements and controls. The same system permits prospective survey respondents to anticipate and prepare in advance for receipt of such compliance surveys, enabling automated responses to anticipated questions associated with relevant DCOs, and pre-planned workflows for addressing exceptional questions that arise. The cumulative results further advance the respondent's readiness to timely respond to the next survey.

Stated another way, it is a goal of the invention to efficiently transform the problem of addressing multiple, overlapping, selected sources of compliance requirements into a more rational and manageable problem of anticipating and addressing questions relating to a limited set of discrete compliance objectives. This goal is met by providing a computer enabled database and associative linking mechanism that expertly ties rules and regulations, irrespective of source, and survey questions, also irrespective of source, to one or more of a limited but comprehensive set of pre-defined, discrete compliance objectives that logically group and collectively span the full range of compliance issues presented by the included sources. The establishment of this limited set of discrete compliance objectives and associative links, with respect to a selected set of compliance rules and requirements, and the pool of common questions, enables a myriad of advantageous computer-enabled tools for monitoring and managing compliance issues of participating organizations.

In one aspect of the invention, knowledge modules are provided which provide a consistent, expert basis for interpretation of individual compliance requirements. In another aspect, the invention provides for the rationalization of regulatory and industry compliance standards, controls and rules to a limited set of discreet compliance objectives, with which specific survey questions and answers can be readily associated. In yet another aspect of the invention, there is provided a mechanism for efficient collection, updating and management of a broad range of compliance evidence. In still yet another aspect of the invention, this evidence can be filtered and ordered in response to particular formal or informal compliance surveys of internal or external origin.

The invention is particularly but not solely relevant to financial institutions, government regulators, service providers, and corporate consumers concerned with or trafficking in personal, financial, or healthcare services information. Such trafficking may be occurring in any medium such as for instance computer data sharing and storage over a local or global computer network where peer to peer organization assurances of compliance with best practices are commonly required in order to conduct secure business transactions. State of the art security measures are understood to be employed in the design and implementation of the system and process in order to insure the integrity of the information and operation.

The host-managed enterprise system and methodology of the invention employs a relational database that links a regulations or authoritative section to a questions section by means of a compliance objectives component. The compliance objectives component is a unique aspect of the system. It consisting of a limited set of expert-derived, discreet compliance objectives (DCOs), created independent of any specific regulation or industry standard, but where the full set of DCOs is intended to represent the full scope of all the requirements and controls in the regulations section, and there is a reasonably clear focus and scope to the definition of each individual DCO as a core functionality or subject area of compliance assessment, so that overlap between DCO's is minimal.

The regulations section consists of a library of specific knowledge modules, each consisting of a government issued regulation or set of regulations, or an industry accepted compliance standard, such as ISO27002 or CoBiT 4.1 or HIPAA, for example, each being referred to here as an "authoritative source". In client edited editions or embodiments, client policies and objectives in the form of further requirements, controls and rules may appear in this section as well.

Each authoritative source in the regulations section is preferably but not necessarily hierarchically organized, structured, or ordered in the presentation of its details, either by the original authors or by further editing by a domain expert, such as by its (a) high level requirements, (b) controls for each requirement, and (c) rules for affecting each control. Compliance with a control or rule can be measured by asking or testing one or more questions associated with the control or rule. Typically, but not necessarily, new authoritative sources added to the system are accompanied by related questions. The answers to the questions will show the extent to which the requirements are met. The number of rules of a control that are met will reveal the extent to which that control is being maintained; and the extent to which controls are maintained is informative as to whether the respective high level requirement is being met, and so on.

The pool of all questions for all rules and controls of all selected sources makes up the questions section. Each question in the pool normally is mapped to at least one rule, or in the alternative associated with a DCO. Each rule from every control from every standard, and all of its related questions by association, is linked on the basis of expert analysis of the requirement, control and rule to one or more of the DCO's, so that all rules from different standards having a common objective are associated through that DCO. More over, all questions related any one rule linked to a DCO are, through their association with the DCO and its association with other rules, assumed to be relevant to all the other controls and rules linked to that same DCO. The result is that for any combination of controls being assessed, there are likely to be questions relating to more than one control, so that fewer than all related questions need to be asked in order to assess compliance with the selected control set, and hence with the requirements of the selected authoritative sources where the controls originated.

This expertly rationalized requirements-to-independent objectives (RIO) association is applied to each new authoritative source when added to the regulations section. The DCO set and methodology provides a stable platform or reference with which to compare the requirements of different sources. This tends to level the impact of any one source on the question pool and provides greater assurance of a reliable and predictable outcome to a mixed or blended source assessment methodology. For these reasons, it is a vast improvement over simpler source-to-source mapping schemes.

The invention, in one respect, provides a powerful tool for the automation of multi-source compliance testing, because a single question, answered once, may indicate the state of compliance with several rules and controls extending to several authoritative sources.

In another respect, a client of the system or service may request an assessment for itself or for a vendor or other third party on the basis of a selected source or a combination or blending of sources, or on the basis of one or more DCOs of interest or a combination of sources and DCOs, and may even further request the assessment be created or modified to include client-specified policies and requirements. Through the power of the expert associations represented by the DCO scheme, an efficient, targeted assessment survey can be formulated from the pool of questions. Since the answers to many questions inform the state of compliance with several controls or rules through the DCO association, the total number of questions directed to a client applicant can be more limited than otherwise. And if a further requirement for assessment as to another source is required, the already recorded survey and answer set of compliance can be readily applied as far as applicable to the further source requirements, and the remaining controls and rules that need to be assessed can be readily identified and an appropriate survey prepared.

Additionally, a client may keep a general purpose assessment survey covering the applicable sources, up to date with periodic self assessments so that relevant portions of its own assessment survey results can be easily parsed and released at any time in response to specific compliance assessment requests by customers or regulators.

It is a further goal of and within the scope of the invention that industry experience and feedback about the multi-source assessments and related reports provided by the invention will stimulate refinements to the DCO set and the associative scheme of source requirements to DCOs, as well as to the depth and breadth of the question pool and the associative scheme of questions back to the source requirements.

Advantages afforded by the invention include the ability of providing automated, timely notifications to users or regulators of changes in compliance requirements, or to management with respect to its own or to a monitored third party's compliance evidence or answers to compliance questions. A web-based interface provides a user-friendly, internet or intranet system access and distributes participation down to the responsible individuals for either or both monitoring and providing of compliance information. Configurable primary workflows and alternative workflows for middle and line level compliance accounting can be automated to offload compliance managers of having to provide repetitive detailed instructions. Collection of survey answer data can be automated, with flagging of exceptional answers to critical questions for immediate middle management review and summary reports as needed.

The system may be provided to users as a hosted system accessed via a global computer system, or as an internal program running on a user operated and controlled computer system, modified to the user's own requirements, and updated with host-provided additions and revisions at times and to an extent controlled by the user.

It is likewise within the scope of the invention that what is described here be replicated in other industries, and adapted for taking the measure of an applicant as against one or multiple authoritative standards, be they design, process, or performance standards, by the use of its independent DCO scheme for rationalizing different source requirements against a limited, stable set of generic, discreet, primary objectives, in combination with its associating of test questions from a common question pool with multiple source requirements by use of the DCO.

Other and various embodiments, variations, equivalents, options and opportunities for greater efficiency in measuring and sustaining compliance with multiple authoritative sources among multiple industry participants will be readily apparent from the description and claims that follow.

BRIEF DESCRIPTION OF THE FIGURES

FIG. 5 is a screen shot of a report of one embodiment, illustrating scoring of a responding organization by discrete compliance objectives in 3 month intervals whereby changes or trends are more readily apparent.

FIG. 2 is a diagrammatic depiction of the compliance assessment system of FIG. 1, extended to include an answer mapper system for producing question sets and compliance objectives in response to user queries.

DETAILED DESCRIPTION OF THE INVENTION

The invention is susceptible of many embodiments, examples and variations. What is described here is illustrative but not limiting of the scope of the invention. The invention in one aspect is a computer-enabled relational database and engine with associative links between sources, questions, and compliance objectives, accessible by clients for the purpose of simplifying and automating the testing of organizations for compliance with one or more regulatory standards or sources that have been encoded and included in the system. Access to this engine and database is enabled via common user interfaces with the appliance or computer network, local or global, on which the database and engine are mounted. The translation or association of source requirements and their related test questions to generic compliance objectives is a core principle of the invention. Embodiments of the invention may be derived or duplicated as a "child" or subset of a master embodiment, for use, for example, by a subset of clients of the master or parent version. Also, the invention may be replicated functionally but with difference sources and questions, being directed to alternate markets, industries, governments and/or geopolitical regions.

Figure 1:
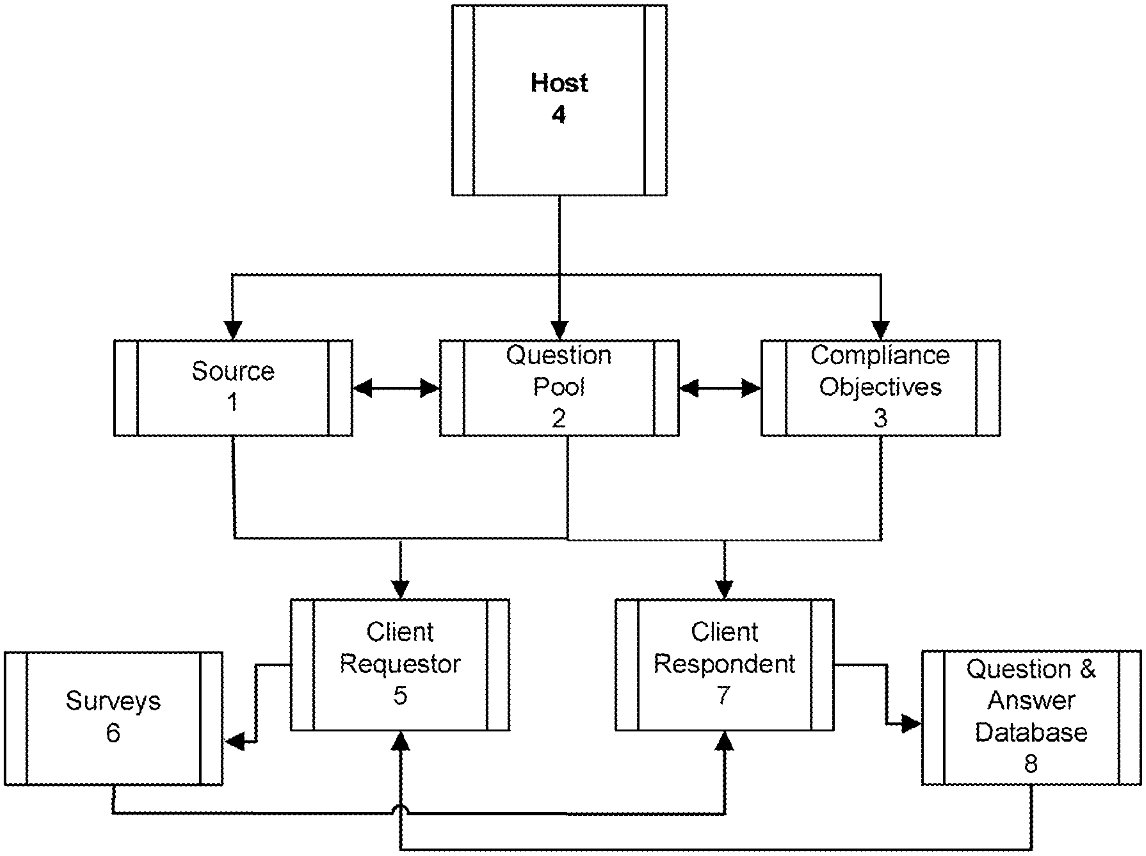
FIG. 1 is a simplified diagrammatic depiction of a compliance assessment system and methodology, illustrating host control and coordination of the associative linkages between source regulations, the question pool and a host-created discrete compliance objectives index by and through which each question is classified and cross referenced to applicable source requirements.

Referring now to FIG. 1, there is illustrated in block diagram form the relationship of sources (1), questions (2), and compliance objectives (3), comprising the core "system" of the invention. Sources (1) is a library of selected compliance rules and regulations, standards and guidelines published by their respective originators, that have been expertly encoded in accordance with the invention and incorporated into the source requirements database. Originators of source requirements may be, for example, governments, government agencies, industry groups, business associations, or influential market leaders. Question Pool (2) is a common master pool of all questions, the answers to which are intended to inform clients as to the state of their compliance with one or more of the sources. Candidate questions for the pool may be supplied by the originators of respective source requirements, the system host (4) or the clients of the system, however the host retains final acceptance of questions and access to the master pool of questions. As further described below, individual or groups of clients may well have and maintain a local database of further or alternate questions specific to their own requirements.

Compliance objectives (3), created and maintained by the system host (4), is the system reference or index of generic compliance objectives, extending to and covering the full scope of all compliance matters raised by the respective sources within the source (1) database. Compliance objectives (3) is a comprehensive but limited set of adjacent, but discrete areas of compliance issues called discrete compliance objectives or DCOs.

System host (4) controls and maintains the system in cooperation with clients (5) and (7) and the originators of respective source materials in Source (1) to insure the two primary goals of the invention are met: (a) that the results of a survey generated by the system is an accurate and meaningful indicator of the degree compliance with the applicable source's requirements; and (b) that the process of complying with requirements of multiple sources is made significantly more efficient for clients by the system and method of the invention, as compared to individual clients treating each source as a "silo" and each assessment survey as a stand alone project. In particular, host (4) provides and maintains the expert encoding or associations of the selected authoritative sources, the compliance objectives, the common pool of questions, and the associative linkages by which each question is mapped to both at least one source side rule or requirement, and at least one discrete compliance objective.

Requestor clients (5) are able to access the system via any respective, or combination, or blend, of sources, questions, and DCO's to have created for them a compliance survey (6) of questions from the question pool (2), appropriate to their needs for assessing compliance of themselves or of a business associate or vendor. The surveys (6) may be sent as illustrated to responder clients (7) or other third parties invited or required to respond. Clients who are participating pro-active respondent clients (7) in the process of the invention will maintain a local database (8) of questions applicable to themselves, self testing from time to time on an automated or manual basis or otherwise updating their own answer set so that they are prepared to respond quickly to an assessment survey when it comes. Requestor clients (5) and responding clients (7) are illustrated as being separate to illustrate the functional difference, but it should be clear that a client can and very often will be both a requester and a respondent. Referring again to and expanding on the FIG. 1 and description above, further terms, details and characteristics of this or other embodiments are explained below.

Authoritative Sources: These are documents created by a governing body, which define the framework, best practices, or regulations in question. They may come from a standards body, such as ISO (International Organization for Standardization), from government agencies, or any other organization, private or public, that produces a set of operations guidance or standards—for example Visa/MC has a PCI (Payment Cards Industry) standard. Examples of sources in one embodiment may include but are not limited to a Standard such as ISO 27002 comprising 39 objectives and 133 rules or controls; a Framework such as CobiT (Control Objectives for Information and related Technology) 4.0; a Regulation such as HIPAA; or as a Guideline such as FFIEC (Federal Financial Institutions Examination Council). Once these source documents have been validated by the system host, typically involving persons of acknowledged expertise in this field or domain referred to here as domain experts, the source content is encoded and loaded into the system database where it becomes available for association to other frameworks and mappings for the question pool.

Discreet Compliance Objectives (DCO): Each embodiment of the invention requires a DCO component, a limited set of DCOs which functions as a stable reference platform or measurement standard by which authoritative sources are evaluated so that their individual test questions can be associated by logical groupings with respective DCO's, and comingled in a common pool of questions where the answers to the questions can be applied to the requirements of multiple authoritative sources. Each DCO is intended to be adjacent but reasonably differentiated with respect to the other DCOs, defining a core area or logical grouping of compliance issues. The DCO section or component of the system provides a relatively simple, stable internal reference or alternate dimension to rationalize the relationship between requirements, rules and questions to a many-to-few (requirements/rules to DCOs) and few-to-many (DCOs or rules to questions) associative relationship.

Where sources and respective rules and requirements for compliance may change frequently as best practices develop, and where questions necessary to resolve issues of compliance may likewise change frequently as technology changes, the logical groupings of compliance issues within the limited set of DCOs is selected, expected and intended according to the invention to remain relatively robust and static. The invention relies on a useful and manageable, relatively static core set of discrete compliance issue subject areas, subject only to very occasional and well considered revisions reflecting a clear or widely accepted need to add to or update the DCO set based on substantive changes in compliance practice and/or a body of experience with using it.

In one embodiment of the invention, a full set DCO set comprises 13 DCOs titled as follows: Governance and Structure; Risk Assessment and Treatment; Security Policy; Organization of Information Security; Asset Management; Human Resource Security; Physical Security; Communications and Operations Management; Access Control; Information Systems Acquisition, Development, and Maintenance; Information Security Incident Management; Business Continuity; and Compliance. Fewer or more DCOs are within the scope of the invention, but significantly fewer or greater numbers of DCOs reduces the power of the associative linking mechanism to efficiently transform the problem of dealing with multiple, overlapping source rules and requirements into a more rational, easily understood and manageable problem of dealing with questions relating to a constant set of discrete compliance objectives.

Computers have the ability, of course, to deal with a very large list of catagories with very fine distinctions. But using a very much larger set of DCO's would begin to divide and distinguish the purpose of each question in the master pool to the point that the amount of overlap between the objectives of related questions would be reduced and benefits of the invention, such as DCO-based surveys expected to reduce the total number of questions required to address the requirements of multiple sources, would likewise be reduced.

Furthermore, generally speaking, there is a limit to the average person's ability to quickly and naturally group things into organized sets, where different questions can be easily and consistently evaluated mentally for the similarity of their respective objective or purpose. There are many factors affecting this, and clearly some people can manage a greater or fewer number of catagories than the "average" person.

On the other hand, using too few DCO's tends to result in having questions with perceivably or noticably different purposes lumped into a single category, so that the answer set to a DCO-based survey may not sufficiently address particular associated rules and controls. This quality of the optimal size of a DCO set can be thought of "granularity"; where too few is too coarse and too many is too fine.

The above comments not withstanding, it is useful to attempt to quantify a useful and manageable range of numbers of DCO's in a DCO set in the context of the invention. In the opinion of the inventors, for purposes of the invention, a useful and manageable optimal DCO set may consist of about 12-18 items, but could easily extend in some embodiments to as few as 3-6 while still providing sufficient differentiation of a rule purpose to be useful, and as many as 25-30 while still being comprehensible in their respective meaning and effectiveness in accordance with the methodology of the invention in reducing the total number of questions needed in a single survey to measure an organization's compliance with the requirements of multiple authoritative sources.

But yet further, while a right-sized list or set of DCO's may be very valuable from an organizational and operational practitioner's standpoint while setting up and executing on an assessment project, it may still be too broad-based to organize meaningful findings, actionable items, or even overall status to the lower levels or certain subsets of an organization. In an extension of the invention, some embodiments may allow the client to create a "namespace" within the confines of a single DCO, which will allow them to further sub-categorize control objectives into groups or units that are meaningful to their specific application.

For example, if an embodiment includes a DCO labeled 'Privacy', it would be easy and efficient to pull assessment questions from the question pool, based on either selecting the DCO, or by selecting one or more sources that contain privacy controls. This assessment can then be executed. However, once the data has been collected, a client may wish to refine or "drill down" into specific areas of privacy. For example, he may wish to subdivide the answers into two groups—for example U.S. and International. He may want to further subdivide International into European Union and Asia/PACRIM. He may desire to subdivide a DCO based on a source characteristic; for example HIPAA related privacy data from personal private financial data. Associations of various source requirements and/or questions with this DCO can be further extended to reach the appropriate name space or subdivision of the DCO. These are only examples of how a DCO may be subdivided to meet extended reporting requirements. Other criteria for subdividing a DCO and extending its associations are within the scope of the invention.

From FIG. 1 and the description above, it can be seen that the DCO set acts as a fixed reference point, index or mechanism to link things together using system cross-mapping rules. The system incorporates associative linking rules that enable several ways to leverage the power of the database for compliance assessment. Examples of cross mapping rules or principles of the invention are described below.

Group 'A' mapping rules regarding Regulations, Standards and Local Policy that would be inclusive of the source (1) section, might include:

a. Regulation to Regulation Mapping.
b. Regulation to Standard Mapping.
c. Regulation to Local Policy Mapping.
d. Standard to Local Policy Mapping.

Group 'B' mapping rules regarding Regulations, Standards and Local Policy of source (1) to assessment questions of the master question pool (2):

a. Regulations to questions.
b. Standards to questions.
c. Local Policy to questions.

Group 'C' mapping rules that start with discrete compliance objectives (DCOs) of compliance objectives (3):

a. Determining what Regulations, Standards and/or Local Policy are affected;
b. Producing a least-common-denominator set of questions for the purpose of assessment.

Group 'D' mapping rules for other uses:

a. Using the Master Question Pool (2) as a query base for free text searching, to find related areas of interest in Regulations, Standards and Local Policy in source (1);
b. Using the data from the 'library' of Regulation and Standard definitions for the same purpose.

Other useful rules for cross-mapping of associative links can be illustrated with matrix diagrams and such. For example, a question may be mapped to a source as in the following example:

Question: "Has an information security policy document been approved by management, and has it been published and communicated to all employees and relevant external parties?"

Source Mapping: "ISO 27002:5.1.1—An information security policy document should be approved by management, and published and communicated to all employees and relevant external parties."

Conversly, source requirements may be mapped to specific questions. For example:

From Authoritative Source PCE-DSS V1.1: "Requirement 4—Encrypt Transmission of cardholder data across open, public networks; 4.2—Never send unencrypted PANS by e-mail."

Question Mapping: "Question: Payment Card Industry Self-Assessment Questionnaire—Is encryption used in the transmission of account numbers via e-mail?"

Figure 2:
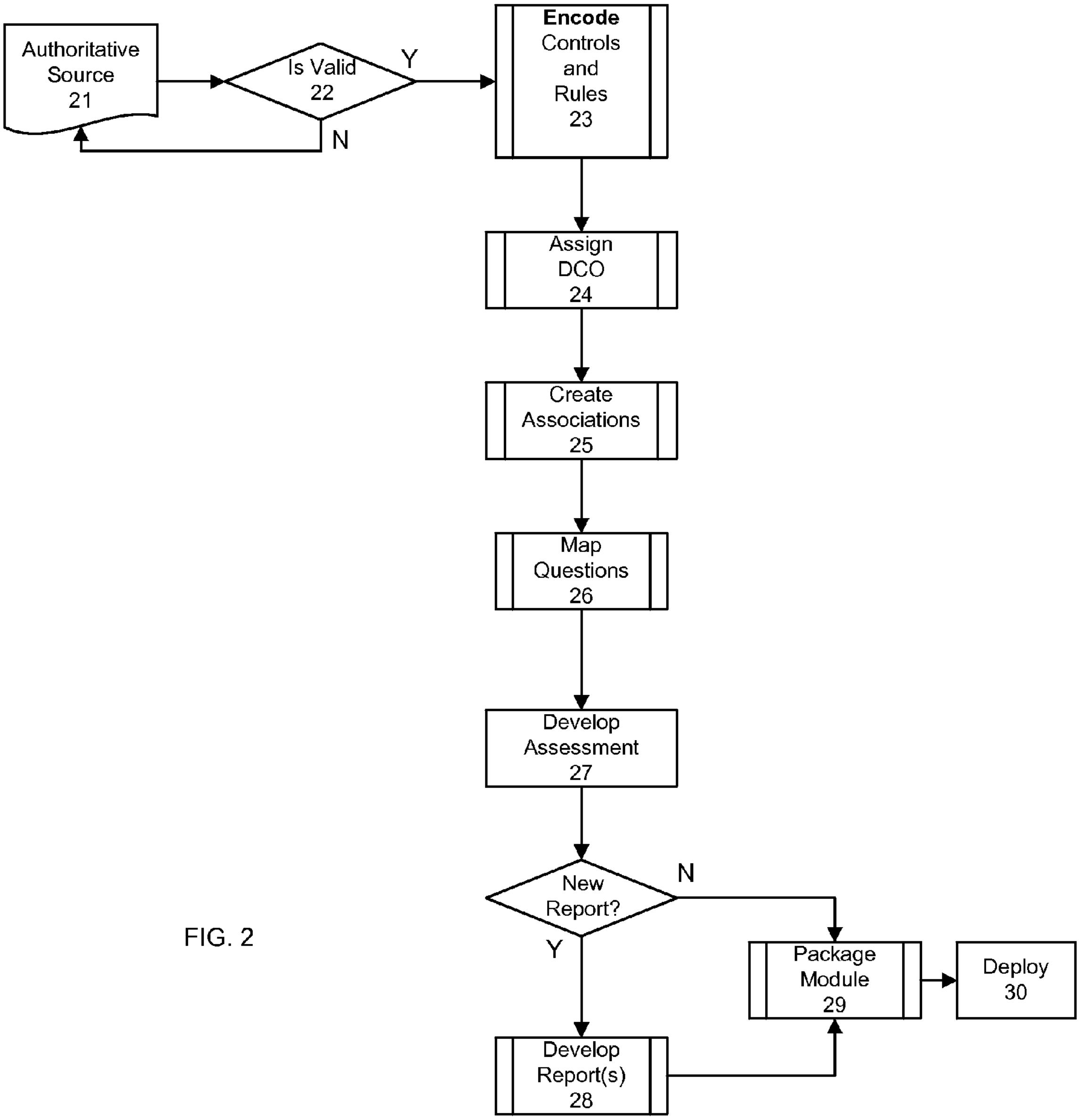
FIG. 2 is a flow chart illustrating steps in one embodiment involved in creating a knowledge module representing an authoritative source being added to the system.

The product of the process by which a particular Authoritative Source is incorporated into the system is referred to here as a Knowledge Module. Referring now to FIG. 2, there is depicted a flow chart of the basic steps of one embodiment by which a Knowledge Module of the invention is created. A prospective Authoritative Source 21 is evaluated for validity 22 with respect to the needs of the client base being served, and its legitimacy as an authority on some relevant area of compliance applicable to at least a portion of the client base.

Assuming the Authoritative Source (21) meets test (22), a domain expert approved by the host encodes (23), makes DCO assignments (24), creates associations (25), and maps questions (26), from which he then develops an assessment (27), for which he may need to develop related reports (28). Thereafter he is able to package the module (29), and deploy it (30) as an initial embodiment or upgrade to an existing embodiment of the invention.

Figure 3:
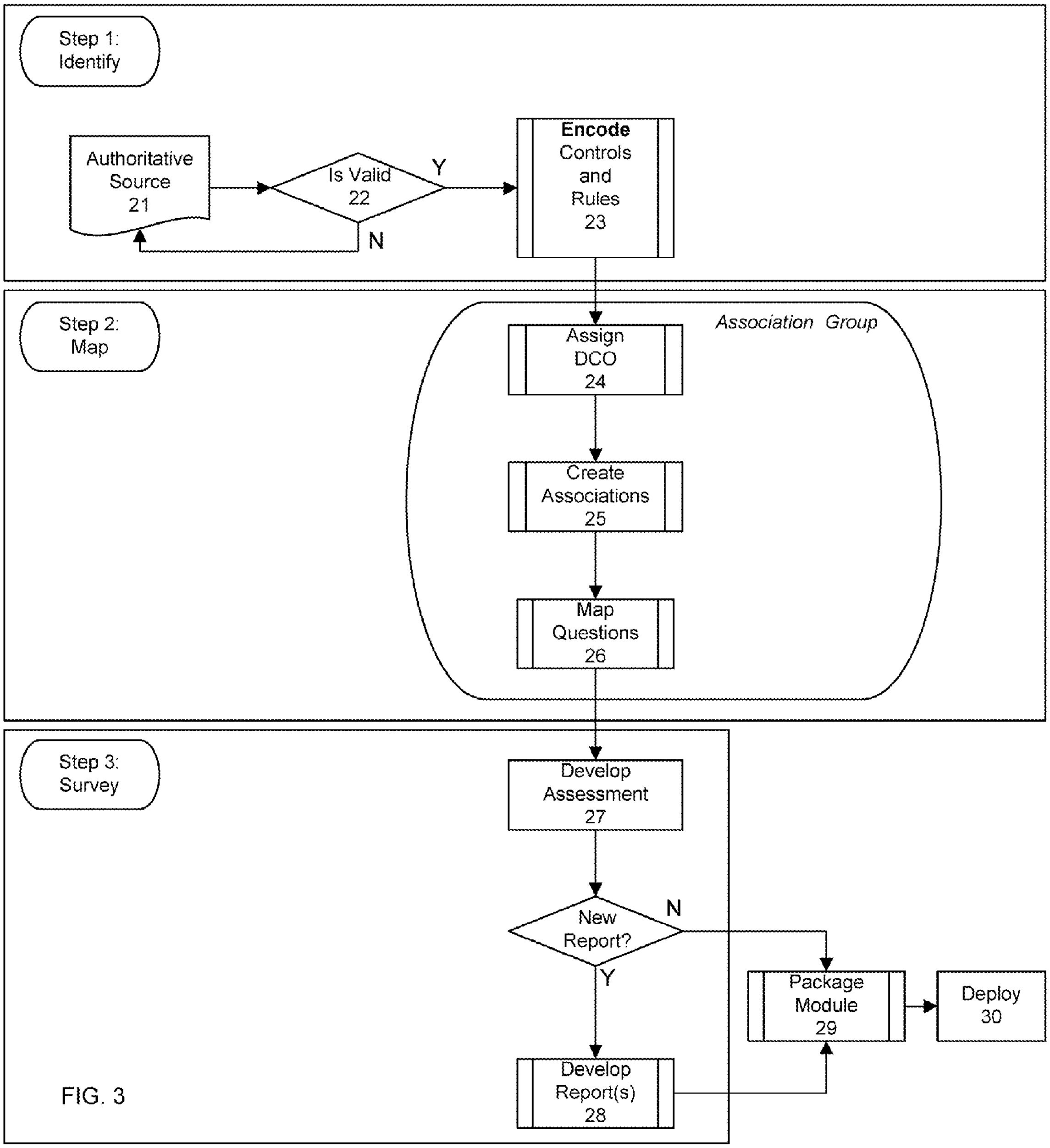
FIG. 3 is a reduction of the several steps of FIG. 2, into three broad steps; identify, map, and survey.

Referring to FIG. 3, the steps of FIG. 2 can be more simply expressed as: step 1, identify and encode a suitable authoritative source; step 2, assign DCO's to source requirements and map all of the related associative links so that each question is linked tied to both at least one source and at least one DCO; and finally, step 3, prepare and make available a basic assessment survey for that particular authoritative source using questions from the master pool.

Once an authoritative source has been encoded, the host's domain expert assigns or links a single DCO category to each control, more specifically to each rule of each control. This allows the host or a client to combine or filter control requirements into a user's understandable logical grouping, for the purposed of organizing assessment projects, and for reporting purposes.

Figure 4:
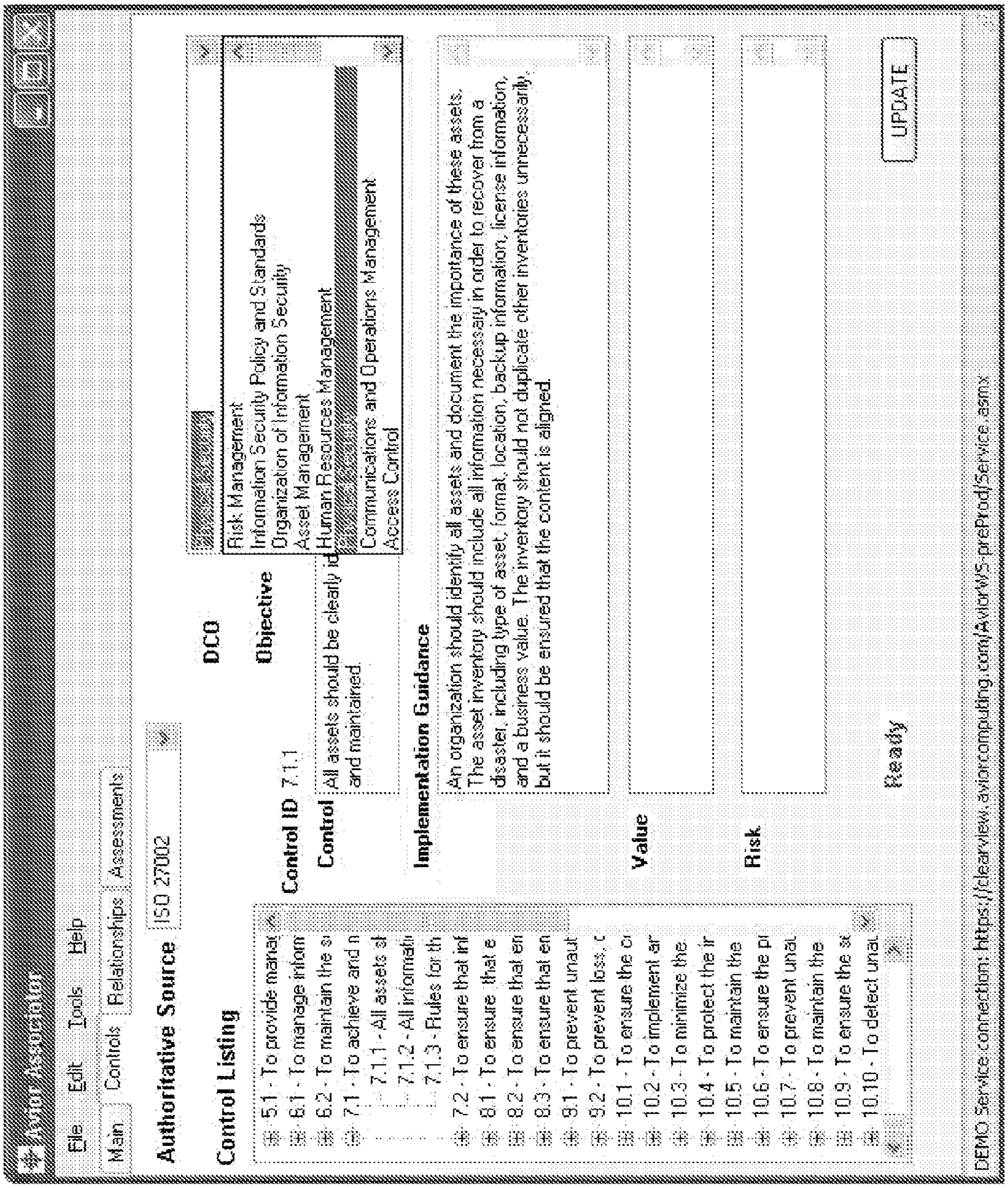
FIG. 4 is a screen shot of a dashboard or user interface tool of one embodiment by which an expert on the subject establishes associations between source controls and discrete compliance objectives prior to deployment of the respective source on the system.

Referring to the FIG. 4 screenshot entitled "Associator"; The above mapping of the various associative links required in the development a Knowledge Module encoding a new Authoritative Source and related questions by the system host's domain expert is facilitated by an Associator tool configured as an easily negotiated computer interface to the system. In this example, a portion of ISO 27002 is illustrated as being mapped to the appropriate DCO.

Once an authoritative source has been encoded and imported into the database, it's controls or rules can be linked to rules encoded for other authoritative sources via their common DCO's or directly one to one, so that ultimately the same or similar rules or controls in all authoritative sources in the database are associated. These links are collectively referred to as Associations. The linkage can be or include both one-to-one relationships and one-to-many. This extended linkage set provides the relationship data for the engine to determine where rules or controls of different authoritative sources overlap with respect to common compliance objectives, enabling the system to reduce duplicate effort during assessment projects, and to provide compliance status and GAP analysis as between sources.

The question pool of FIG. 1 is a set of questions that have been designed to test the controls that are mandated by their respective authoritative sources. Questions may require manual consideration and either or both qualified or quantified answers. Questions may be self-testing as in the form of automated client computer system inquiries or commands, the response to which is the answer. These questions are mapped in the relational database back to each control to which they can provide compliance insight. Again, these mappings can be both one-to-one relationships, one to many, as well as many-to-many. Finally, if a control has a link to a specific question, it is considered a direct mapping. However, the system also utilizes indirect linking—such as where a client is utilizing an authoritative source control or rule that does not have a question mapped directly to it, however, it is associated with another source and control directly or via a DCO, which does have questions mapped to it, where the answers to those questions are relevant to the control or rule of interest.

A record of a complete set of associations between all elements including the specific controls and questions for all authoritative sources in the system database defines a unique system configuration or Master Assessment Configuration (MAC) which may be given a name or version number for ready reference. A MAC might be considered a template, filter set, or root configuration, convenient for the host and system clients for associating an assessment report to the baseline dataset and methodology used in preparing the survey.

The primary output of the engine are compliance reports. In one embodiment, these system outputs are broken down into two categories: Comparing of Authoritative Sources, and DCO Rollups. The "comparing" reports provide information on control overlap between different sources, questionnaire (assessment) coverage of a given source, and GAP (Differences) analysis of assessment result data by DCO or source. A DCO Rollup may be applicable to a particular assessment, as summarizing the compliance objectives being addressed. Referring to the FIG. 5 screenshot entitled DCO Scoring Trend by Quarter; it can be seen in this DCO rollup that quarterly assessments of a particular organization reveal the trends in its compliance rating in each of twelve DCO or "risk" categories of compliance. This report may represent assessment against a single source requirement or a client specified blend that the client thinks provides the best management perspective of the execution of its compliance policy and its state of preparedness to answer a survey from an auditor, be it internal or external to the client organization.

Figure 6:
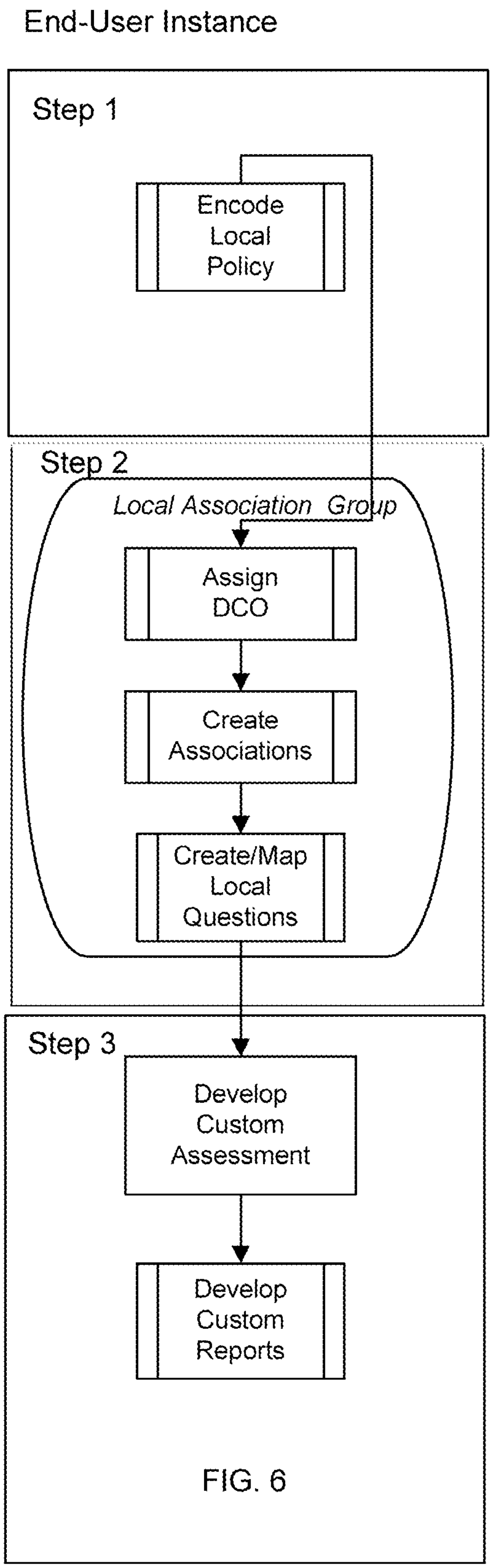
FIG. 6 is a flow chart of a client edition of the into

Referring to FIGS. 3 and 6, there is illustrated in FIG. 6 a subordinate or client variation of the FIG. 3 process, creating a derivative to a host MAC where the client has in step 1, encoded and added aspects of its local policy to the source requirements; in step 2, assigned DCOs and created the further associations between local questions and the modified source and DCO components; and in step 3, created custom assessments and reports reflecting the addition of its local policy concerns in its compliance management system.

In addition to the core capability described above, additional tools are provided to domain experts to maintain the data repository, DCO section, and fundamental associative linkages, and to create or author questionnaires or surveys as required by clients or users. The system architecture also allows for compatibility with external third-party tools as well, such as programs particular to reporting, for example.

Survey Designer Tool: This tool interfaces with the system to create assessment questionnaires. This tool can retrieve data from the question pool, using DCO selections as the operative criteria, along with association data, to automatically generate a set of comprehensive tests for the controls that are required for a particular assessment. This tool also allows the survey author to setup the scoring rubric for that questionnaire, such as, for example, by assigning weights to specific rules or controls, to DCOs, or directly to individual or groups of questions and answers, which will then be summed in the analysis. Other commonly practiced schemes for tailoring topics and survey questions to match the role and importance of specific responses, and/or by specific respondents, are within the scope of the invention.

Associator Tool—Host Version: Referring again to FIG. 4 as illustrative of its functionality, this is the primary tool used by a host domain expert to manage the associations and mappings setup process for adding authoritative sources to the system. When complete, these host-defined, system wide associations configurations, or MACs, are treated as master templates or system version designators, over which strict control is maintained in order to ensure the integrity of the system setup, operation, and surveys and reports issuing therefrom.

Associator Tool—Client Version: This tool is functionally similar to the host-version tool except that a host-defined MAC can not be directly altered or edited by the client version tool. This tool does allow a client to start with a host-defined MAC and modify it so as to create its own client-specific association mapping configurations appropriate to its own requirements, and to label and maintain its own configurations as a derivative of a specific MAC, or a DMAC. The client's derivative specification may be maintained as private record or be made public if it serves the client's purpose. This tool and ability allows a client to augment or alter the fixed associations or mappings of a specific MAC to meet its own needs without impacting continuing definition and availability of the original MAC to other clients as a staple of their compliance practice.

Policy Editor Tool: This tool allows a client to encode its own corporate policies into a selected MAC; and link them to authoritative sources, controls, or DCOs in the MAC as desired. The policy component relates to the client's corporate governance, and may have meta-data surrounding what it is, how it is checked, who has responsibility for it, and so on. As in the client version Associator tool described above, this tool enables creation of a client-specific derivative configuration of a specific MAC, a DAC, and does not alter or interrupt the availability of the MAC upon which it is based. Once its policy additions are encoded, imported, and linked as desired with this tool, the client can utilize the Survey Designer tool to generate assessments that include consideration of the controls and rules referenced by the corporate policies embedded in its client-defined DAC.

System Extensibility: Having the system host maintain a database of authoritative sources, keep them up-to-date as new versions are released, providing base associations between the sources and maintaining a question pool of questions to test their controls, is in itself valuable to organizations for whom compliance is important. However, an expert process of associating different sources and developing a common question pool for testing them, is to some extent a subjective process. The results will inevitably not be totally satisfactory to all parties concerned. To this end, it is anticipated that client edits to the system in the form of client-defined MACs or DMACs may be offered back to the host for host review, acceptance, and posting on the host system, with or without attribution, for access and use by other clients who desire to measure compliance by the same configuration as the client-author. This is a direct form of user participation and insures timely updating of the system as needed. A supplemental or alternative capability enabled by the use of these tools allows clients or client organizations to create a complete 'local override' or add-on configuration to a MAC, a client defined MAC set of alternative and/or supplemental data and linkages specific to the client or client organization that when combined with a compatible MAC, yields a derivative MAC or DAC.

The tools described above allow clients to create and combine further new associative linkages and/or questions or report generators as MAC-compatible tools that can be utilized on a local level—seamlessly integrated with a system hosted MAC or client-defined DAC.

Domain Expert Workflow—Knowledge Module creation: Referring again to FIG. 2, The role of a domain expert is a central aspect of the invention. A domain expert having the requisite skills and credentials is typically tasked to identify and authenticate (22) Authoritative Source standards documents relevant to group of industry participants being served by the invention; encode and import (23) the authoritative source document into the system database; match (25) and map (26) each encoded control/rule to an appropriate discreet compliance objective DCO, and/or to another equivalent control and rule of one or more other sources; generate and/or select and from the existing question pool questions needed to test each control or rule and map each question accordingly. He is then able to develop (27) a generic, source-specific assessment questionnaire or survey, including setting up the rubric or rules by which the survey is conducted and scored, and develop (28) any specialized source-specific reports deemed appropriate to the environment targeted by that source.

According to another aspect of the invention, the compliance assessment system described above allows responders to anticipate applicable regulations and accept model surveys, self-test to the model survey questions taken from the pool of questions, self-analyze, adjust internally and re-test, and store final answers for automated matching to questions in actual surveys. The scheme provides for flexible 'entry points' into the problem space. If a user is starting from a source or regulation, he can provide a user-friendly rollup or categorization mechanism to breakdown that regulation into more manageable or understandable blocks of requirements via the DCOs, and then provide a deep-dive view by providing a set of relevant questions that can be used to assess the current state in reference to that regulation or requirement.

If the user starts from a collection of interesting questions, in what might be characterized as a deep-dive, he gets feedback as to applicable regulatory areas that are being touched, enabling the augmenting of that question set until it reaches the level of coverage that the user seeks in terms of one or multiple regulations.

Additionally, but not exhaustive of the capabilities of the invention, the user can start at the compliance objective level (the DCOs), selecting the set of high-level items or compliance objectives that are important to his operation or application, and allow the system to fan out in both directions—provide the question set that allows the deep-dive into compliance details, as well as the rollup (reporting) against the regulatory goals or requirements.

Figure 7:
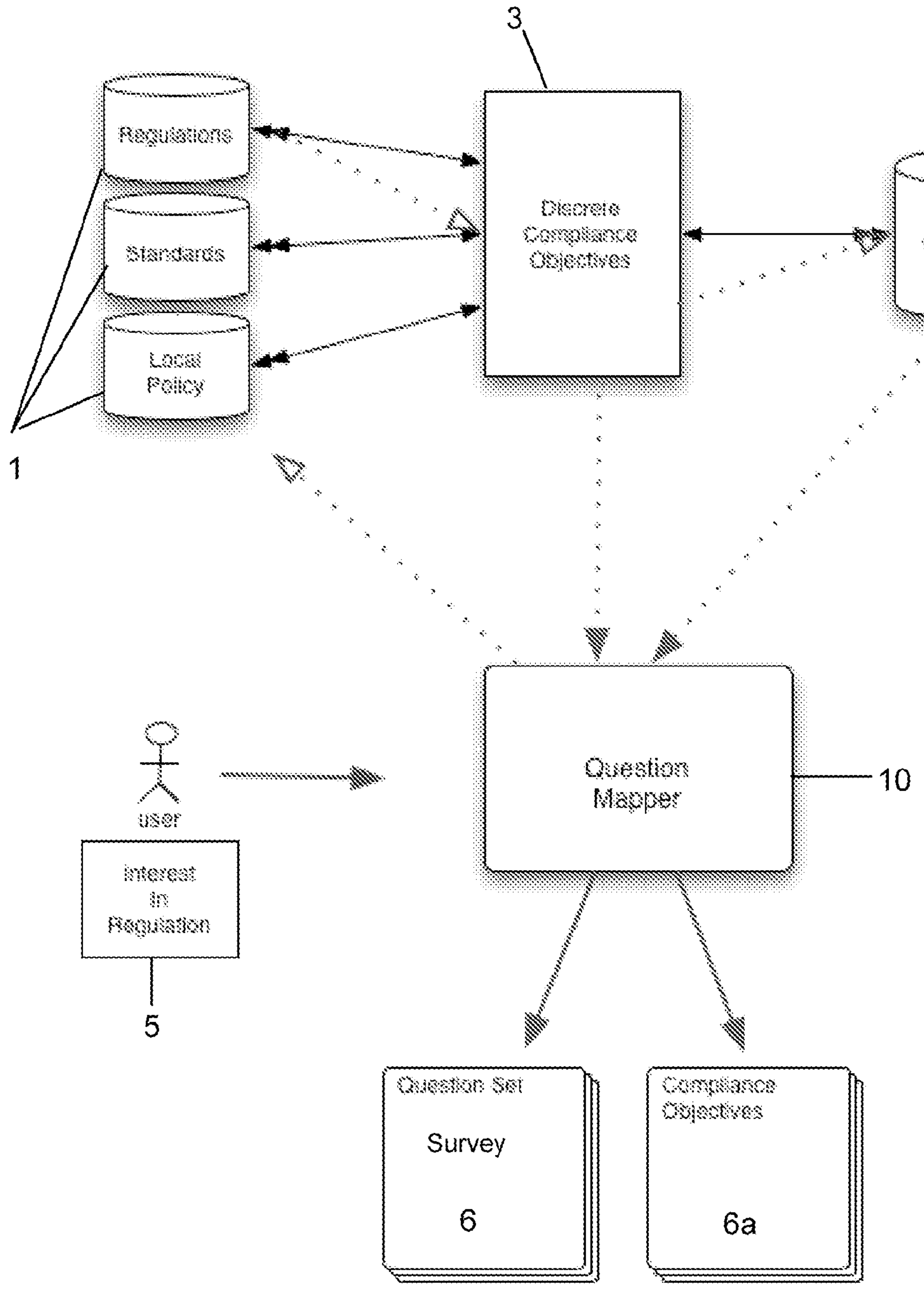
FIG. 7 is a simplified diagrammatic depiction of a compliance assessment system and methodology, illustrating a regulatory source component of regulations, standards and local policy associated with a set of discrete compliance objectives and a master question pool, all of which are accessible by a user via a question mapper for creating a question set for measuring compliance in the context of selected compliance objectives.

Illustrating the flexibility described above, and referring now to FIG. 7, there is disclosed in simplified form an embodiment of the compliance assessment system of the invention that includes an additional element over the analogous elements of FIG. 1, a tool for the user, an answer mapper (10). Dotted lines between elements indicate associative links to the major components of the compliance assessment system whereby the answer mapper (10) can access the linked system databases in order to produce survey question sets (6) according to related compliance objectives (**6*a***).

Reviewing again from a user perspective, regulators, financial institutions, service providers, vendors, and others trafficking in financial or personal information data and use a compliance system of the invention may be classified into two groups with respect to their use of the invention; requestors and responders. Many participants will be classified as requesters in some instances, and as responders in other instances, depending on their role in their relationship with their business partners, or their responsibility as or accountability to regulators.

For example, requesters may be regulators or clients or other auditors such as industry participants desiring to assess their own regulatory compliance or that of a service provider or vendor or other user or business partner or associate participant in the subject industry accountable to them, may access the system several ways. For example, access for obtaining a survey may be based on a specific authoritative source such as a regulation, rule, industry standard, or policy statement; or through one or more DCOs based on generic compliance objectives on selected topics, or some blending of sources, local policies and/or DCOs, to create or obtain an assessment survey appropriate to their requirements. The requester may decide to add or change some requirements and/or some questions, using the tools described elsewhere within. The requester may elect to review the selected questions for suitability, add or delete questions or expand the survey to include other source or DCO catagories if desired. The requester may then self test and/or forward the final survey to a target service provider or third party for whom it was designed.

A client user may have anticipated its own need to be in compliance with certain regulations or sources, have accessed the system previously for an applicable survey, have done self assessments and made internal adjustments to be in compliance, and prepared answers in advance. Indeed, the client may have a policy of periodically conducting the internal survey and reporting to management on the state of its compliance in this manner The questions and answers to the recurring survey may be maintained up to date in its own database, or posted to a secure site, for automated matching to later received surveys from qualified requesters, whereby a prompt response can be easily generated, reviewed, and released to the requestor. Security measures provide that the requester be validated prior to any access to the responses.

In the event a survey contains questions not anticipated, the system is able to generate an exception list of previously unanswered questions and the responder need only address those extra questions. This may be done with a pre-planned and automated workflow that identifies the compliance objective associated with the exception question and puts the question before the individual designated in advance for handling questions relating to that compliance objective. His or her response will complete the survey for export to the requester (after the requester is verified). The exception questions and answers are also retained in the organization's own compliance database as part of its internal compliance SOP, being posted, for example, to a secure site in anticipation of a next round survey containing any or all of the same questions.

Alternatively or concurrently with regard to receipt of unanticipated questions, the responder can access the compliance system through the question pool and by the power of its associative linkages ascertain which regulations, rules or sources may have prompted the questions. The responder may decide those sources, regulations or rules are not applicable to it and communicate this opinion to the requestor.

To illustrate this aspect of the invention by way of a simple example, consider there to be within the regulatory or source section the following standard:

a. "ISO27002:2005, Chapter 6 Organization of Information Security, Section 1 Internal Organization, Subsection 1 Management Commitment to Information Security"

This may be mapped to a DCO within the DCO library as the following compliance objective:

a. "Information Security Program Management: Commitment, Organization Structure, Culture"

This DCO may map to additional questions 1, 2, 3, 4, and 5 from the following question set:

1. Does management actively support security within the organization through clear direction, demonstrated commitment, explicit assignment, and acknowledgement of information security responsibilities?
2. Are information security activities coordinated by representatives from different parts of the organization with relevant roles and job functions?
3. Have all information security responsibilities been clearly defined?
4. Has a management authorization process for new information processing facilities been defined and implemented?
5. Have requirements for confidentiality or non-disclosure agreements reflecting the organization's information protection needs been identified and are they regularly reviewed?
6. Are users only provided with access to the services that they have been specifically authorized to use?
7. Are appropriate authentication methods used to control access by remote users?
8. Has automatic equipment identification been considered as a means to authenticate connections from specific locations and equipment?
9. Are physical and logical access to diagnostic and configuration ports controlled?"

The appearance of any of questions 1, 2, 3, 4 and 5 in a survey can be traced back by a respondent through the DCO to the ISO standard and any other linked source to which the question may relate.

It should be evident from this description that the system can be entered or accessed through any of the three major component libraries in order to serve the needs of several classes of users: (a) requestors needing to design surveys; (b) responders needing to prepare their answer maps; and (c) regulators and other 3rd party monitors and vendors for whom the information is relevant or useful.

The system further enables readily produced compilations of data from several respondents, which can remain identified for distinction or be unidentified for more general purposes, depending on the needs of the requester or regulator.

Survey Designer: In yet another aspect of the invention, there is a survey designer in the form of a desktop tool which enables an organization to create an assessment definition set that, when installed into a Compliance Application, becomes available as an online survey that can be used to measure compliance to that specific question set. This application is a vehicle for an end user to interact with the question mapper described above, normally via a web services interface, and may be provided by a system host as a service on a subscription basis. This tool exposes the 'entry points' described above, in an easy-to-use format or user-friendly metaphor, in some embodiments having both a 'Wizard Mode' which resembles an interview process, prompting the user for required information in a logical manner, and in other embodiments or alternatively, in an expert mode that allows a more advanced user access to 'power' features.

In either mode, the user selects a starting point: regulation, standard, policy, or some combination thereof; the pre-defined DCO list; or the pool of questions, and uses that as a starting point to develop survey content.

One embodiment provides that the tool, however configured, provides the user with the ability to create an assessment-scoring model or rubric. This model is typically setup by an individual with expert domain knowledge relative to the survey content, and consists of a process of assigning weighted values to each question as well as any question groups. This allows the survey author to effectively weight those portions of the survey that are considered more important with a higher significance towards the calculation of an overall score. By embedding the scoring model directly within the assessment definition, all submitted instances of the assessment are rated in a consistent and predictable manor.

This technique brings to the system and process the opportunity to format surveys so that the analysis and scoring produces a meaningful comparison to predetermined benchmark score for each submission as it is received, and then provide timely alerting and easily interpreted reporting to interested parties.

There are other and numerous embodiments and examples of the invention. For example, there is a computer enabled system and method for measuring organizational compliance with selected operational requirements, consisting of using a relational database and software engine system where in the database there is an authoritative source library accessible for selection by users, the source library consisting of at least compliance controls for organizational operations. There is a limited set of discrete compliance objectives accessible for selection by users; the set of discrete compliance objectives consisting of logical groupings of compliance areas by subject matter. And there is a master pool of questions accessible for selection by users, where each question is associated by associations or linkages within the database with at least one control in the authoritative source library and with at least one discrete compliance objective.

The system and method includes selecting at least one from among the group consisting of the source library, the set of discrete compliance objectives, and the master pool of questions as a criteria for creating a compliance survey; and using the criteria and the associations within the database for assembling a subset of the questions in the master pool as a compliance survey or auditing instrument.

The system and method further includes requesting of an organization an answer set in response to the compliance survey, and responding by the organization with the requisite answer set; then analyzing the answer set for organizational compliance, and reporting the organizational compliance to a requester.

The set of discrete compliance objectives in various embodiments may range between 3 and 30 discrete compliance objectives, or between 10 and 20 discrete compliance objectives, or 12 to 18. The number within a particular embodiment is likely to remain constant but may be changed from time to time in either a host or client version of the invention.

In another example, the system and method includes selecting and validating a prospective authoritative source that has its own requirements and controls; encoding the requirements and controls in a format consistent with the embodiment for which it is intended; linking as an association within the database each control of the prospective authoritative source with at least one of the group consisting of at least one discrete compliance objective from the same embodiment, at least one question from the master pool of the same embodiment, and with at least one control associated with an existing authoritative source within the database; and then deploying the prospective authoritative source with the intended embodiment system.

As another example, embodiments may provide for reporting the answer set in the context of the criteria for creating the compliance survey. In other words, if the survey was generated on the basis of selected DCO's, the reporting on compliance may be reported with respect to compliance with the same DCO's. The same principle applies to whatever singular or blended criteria were used for preparing the survey. Separately or in addition, reporting may include comparison to compliance benchmarks or pre-determined scores in selected areas of compliance that may represent target goals or average scores or some other desirable reference score with which a comparison may provide further insight with respect to an organization's performance. Reports may include prior scores so that trend information is illuminated. Self testing and reporting as a means for preparing for outside audits by regulators or other third parties, based on client-selected criteria, is within the scope of the invention. In other embodiments, the requesting of an organization to submit to a survey or audit may include requesting responses from multiple organizations to the same survey, to which the multiple organizations will respond with respective answer sets. Analyzing and reporting of the respective answer sets may include comparative and/or cumulative analysis and comparative and/or cumulative reporting.

Some embodiments may include pre-determined or client selected weighting of questions in the compliance survey for relative significance, whereby analyzing a respective answer set takes the weighting into account in scoring the responder's compliance.

The invention and other and various embodiments, examples, variations and equivalents of and within the scope of the invention will be readily understood by one skilled in the art from all that is disclosed herein.

We claim:

1. A computer enabled method for enabling a user to measure compliance of an organization with selected operational requirements, comprising:

executing on a computer instructions which cause the computer to generate a relational database and engine system comprising:

an authoritative source library accessible for selection by users, said source library comprising compliance controls applicable to subject elements of the organization, the authoritative source library including compliance controls associated with a plurality of authoritative sources, each of the compliance controls being associated with a specific authoritative source;

a limited set of discrete compliance objectives accessible for selection by users, each of the discrete compliance objectives being a compliance category under which compliance controls are logically grouped according to their objectives, each of the compliance controls being associated by associations within the database with at least one of the discrete compliance objectives; and a master pool of questions accessible for selection by users, each said question being associated by associations within the database with at least one of the compliance controls in the authoritative source library and with at least one of the discrete compliance objectives;

selecting by the user of criteria for creating a compliance survey, said criteria including at least one discrete compliance objective; and using said relational database according to the selected criteria and said associations between the compliance controls and the discrete compliance objectives and between the questions and the discrete compliance objectives, assembling a subset of the questions in the master pool as the compliance survey, wherein the steps of selecting and using are performed using a computer.

2. The method of claim 1, further comprising:

requesting of an organization an answer set in response to the compliance survey;

receiving from the organization a response including the answer set;

analyzing the answer set for organizational compliance, and reporting the organizational compliance to a requestor.

3. The method of claim 1, said limited set of discrete compliance objectives comprising between 3 and 30 discrete compliance objectives.

4. The method of claim 1, said limited set of discrete compliance objectives comprising between 10 and 20 discrete compliance objectives.

5. The method of claim 1, further comprising:

selecting and validating a prospective authoritative source comprising respective said requirements and respective said controls;

encoding the requirements and controls of said authoritative source;

associating each said control of the prospective authoritative source with at least one of the group consisting of at least one discrete compliance objective, at least one question from the master pool, and at least one control associated with an existing authoritative source within the database; and deploying said prospective authoritative source with the system.

6. The method of claim 2, said reporting comprising:

reporting the answer set in the context of the criteria for creating the compliance survey.

7. The method of claim 2, said reporting comprising:

reporting the answer set in the context of the discrete compliance objectives.

8. The method of claim 2, said reporting comprising:

reporting of the answer set in the context of predetermined benchmarks for compliance.

9. The method of claim 2, said reporting comprising:

reporting of the answer set in the context of previous answer sets to the same or similar surveys whereby changes in compliance are indicated.

10. The method of claim 2, said requesting and responding comprising self testing by the organization.

11. The method of claim 2, said requesting being done by an industry regulator responsible for regulating the organization.

12. The method of claim 2, said relational database and engine system being controlled and maintained by an independent host entity.

13. The method of claim 2, further comprising weighting of questions in the compliance survey for relative significance whereby analyzing the answer set takes the weighting into account.

14. The method of claim 2, said requesting of an organization comprising requesting of multiple organizations, said responding by the organization with the answer set comprising responding by the multiple organizations with respective answer sets; said analyzing the answer set for organizational compliance comprising analyzing the answer sets, and said reporting the answer set comprising reporting the answer sets.

15. The method of claim 14, said analyzing and said reporting comprising:

analyzing and reporting the answer sets in the context of comparing the respective organizations.

16. The method of claim 2, said reporting the answer set comprising reporting the answer set in the context of a specific said authoritative source.

17. The method of claim 1, wherein assembling a subset of the questions in the master pool as the compliance survey includes:

identifying a first compliance control of a first authoritative source in the authoritative source library, the first compliance control being associated with a first discrete compliance objective;

identifying a second compliance control of a second authoritative source in the authoritative source library, the second compliance control also being associated with the first discrete compliance objective;

reviewing the questions in the master pool which are associated with the first discrete compliance objective, and selecting from among them a doubly relevant question which is associated with both the first compliance control and the second compliance control; and including the doubly relevant question in the compliance survey.

18. The method of claim 2, wherein assembling a subset of the questions in the master pool as the compliance survey and analyzing the answer set for organizational compliance include:

identifying a first compliance control in the authoritative source library, the first compliance control being associated with a first discrete compliance objective;

identifying at least one question included in a previously recorded survey which is associated with the first discrete compliance objective;

selecting from among the identified questions a question included in the previously recorded survey which is relevant to the first compliance control; and omitting the selected question from the compliance survey, but including the answer set for the selected question from the previously recorded survey when analyzing the answer set for the compliance survey.

19. The method of claim 1, wherein at least one of the discrete compliance objectives includes a plurality of namespaces, each namespace representing a sub-category of the discrete compliance objective.

20. The method of claim 2, wherein:

at least one of the questions in the compliance survey is a self-testing question in the form of an automated computer inquiry or command;

requesting of an organization an answer set in response to the compliance survey includes issuing of the automated computer inquiry or command; and receiving from the organization a response includes receiving an automated response to the automated computer inquiry or command.

21. The method of claim 1, wherein:

the relational database and engine system further comprises an answer mapper which is able to access the relational database and engine and produce compliance surveys according to the associations between the questions in the master pool of questions and the discrete compliance objectives; and assembling a subset of the questions in the master pool as the compliance survey includes selecting by the answer mapper of questions in the master pool according to their associations with the discrete compliance objectives.

22. The method of claim 2, wherein reporting the organizational compliance to a requestor includes categorizing the organizational compliance according to the discrete compliance objectives.

23. The method of claim 2, wherein receiving from the organization a response includes receiving responses to questions from survey respondents which have been prepared in advance due to anticipations of the questions by the respondents, the questions having been anticipated due to their associations with discrete compliance objectives which are relevant to the respondents.

24. A computer-based system enabling a user to measure organizational compliance with selected operational requirements, the computer based system comprising:

a computer including non-transitory media containing computer executable instructions which, when executed by the computer, cause the computer to generate a relational database and engine comprising:

an authoritative source library accessible for selection by users, said source library comprising compliance controls applicable to subject elements of the organization, the authoritative source library including compliance controls associated with a plurality of authoritative sources, each of the compliance controls being associated with a specific authoritative source;

a limited set of discrete compliance objectives accessible for selection by users, each of the discrete compliance objectives being a compliance category under which compliance controls are logically grouped according to their objectives;

a master pool of questions accessible for selection by users; and associations within the database whereby each said compliance control is associated with at least one of the discrete compliance objectives, and each said question is associated with at least one of the controls in the authoritative source library and with at least one of the discrete compliance objectives; and a display device in communication with the computer, the display device being able to display a user interface whereby users may specify criteria by which a compliance survey is generated according to the associations between the compliance controls and the discrete compliance objectives and between the questions and the discrete compliance objectives, said criteria comprising at least one-selected discrete compliance objective.

25. The system of claim 24, said engine comprising means for analyzing an answer set provided in response to said compliance survey and providing a compliance report.

26. The system of claim 25, said compliance report organized in the context of at least one from the group consisting of a specific said authoritative source, a selection of discrete compliance objectives, and selected questions from the master answer pool.

27. The system of claim 24, further comprising an answer mapper, the answer mapper being able to access the relational database and engine and select questions from the master pool of questions for inclusion in compliance surveys, the selection being according to the associations between the questions and the discrete compliance objectives.

* * * * *